United States Patent
Rocamora et al.

(10) Patent No.: US 10,660,440 B2
(45) Date of Patent: May 26, 2020

(54) AIRCRAFT CABINET WITH DETACHABLE OUTER PANELS AND ATTACHEMENT MECHANISM THEREFOR

(71) Applicant: BOMBARDIER INC., Dorval (CA)

(72) Inventors: Yvan Rocamora, Ile Bizard (CA); Pasquo Perrotta, Montreal (CA); Frederic Charlebois, Coteau-du-Lac (CA); Mathieu Houle, Montreal (CA); Surinder Bharaj, Brossard (CA); Jonathan Beauparlant, Pointe-Claire (CA)

(73) Assignee: BOMBARDIER INC., Dorval (CA)

(*) Notice: Subject to any disclaimer, the term of this patent is extended or adjusted under 35 U.S.C. 154(b) by 310 days.

(21) Appl. No.: 15/521,144

(22) PCT Filed: Oct. 29, 2015

(86) PCT No.: PCT/IB2015/058368
§ 371 (c)(1),
(2) Date: Apr. 21, 2017

(87) PCT Pub. No.: WO2016/067249
PCT Pub. Date: May 6, 2016

(65) Prior Publication Data
US 2018/0332965 A1      Nov. 22, 2018

Related U.S. Application Data

(60) Provisional application No. 62/073,175, filed on Oct. 31, 2014.

(51) Int. Cl.
*A47B 47/00* (2006.01)
*A47B 96/20* (2006.01)
(Continued)

(52) U.S. Cl.
CPC .............. *A47B 96/20* (2013.01); *A47B 47/00* (2013.01); *A47B 81/00* (2013.01); *F16B 12/10* (2013.01);
(Continued)

(58) Field of Classification Search
CPC ......... A47B 96/20; A47B 47/05; A47B 81/00; F16B 12/10; B64D 11/00; B64D 2011/0046
See application file for complete search history.

(56) References Cited

U.S. PATENT DOCUMENTS 3,508,371 A    4/1970 Meyer
3,704,563 A   12/1972 Waller
(Continued)

FOREIGN PATENT DOCUMENTS

CN       2193081 Y      3/1995
CN     203908400 U     10/2014
(Continued)

OTHER PUBLICATIONS

China National Intellectual Property Administration, Notification of First Office Action dated Aug. 27, 2018 re: Chinese Patent Application No. 201580058946.6.
(Continued)

*Primary Examiner* — Matthew W Ing
(74) *Attorney, Agent, or Firm* — Norton Rose Fulbright Canada LLP (57) ABSTRACT

A cabinet for installation in an aircraft, having a shell (22) defining a load-bearing structure of the cabinet and an outer panel (18) configured to be detachably connected to the shell (22), the outer panel (18) defining at least a part of the visible surfaces of the cabinet. The outer panel (18) is detachably connected to the shell (22) in a stationary position relative to the shell (22) through engagement of complementary attach-
(Continued)

ment members (50, 51) respectively attached to the outer panel (18) and to the shell (22), the complementary attachment members (50, 51) allowing an adjustment of the stationary position of the outer panel (18) relative to the shell (22) when the outer panel (18) is detached from the shell (22). A method of manufacturing a cabinet for an aircraft is also discussed.

14 Claims, 8 Drawing Sheets

(51) Int. Cl.
  A47B 81/00 (2006.01)
  F16B 12/10 (2006.01)
  B64D 11/00 (2006.01)
(52) U.S. Cl.
  CPC ...... *B64D 11/00* (2013.01); *B64D 2011/0046* (2013.01)

(56) References Cited

U.S. PATENT DOCUMENTS

| | | | |
|---|---|---|---|
| 3,731,956 A | 5/1973 | Hanley | |
| 3,877,765 A | 4/1975 | Hassing | |
| 5,176,435 A | 1/1993 | Pipkens | |
| 5,628,257 A | 5/1997 | Conner et al. | |
| 5,791,752 A | 8/1998 | Hartman | |
| 5,839,806 A * | 11/1998 | Liu | A47B 67/04 312/257.1 |
| 6,095,623 A * | 8/2000 | Goto | A47B 81/06 312/139.2 |
| 6,419,330 B1 * | 7/2002 | Lechman | A47B 17/00 312/194 |
| 6,565,166 B1 * | 5/2003 | Bulk | A47B 47/04 312/223.6 |
| 7,178,886 B2 * | 2/2007 | Hightower | A47B 96/00 312/204 |
| 8,769,779 B2 | 7/2014 | Lee | |
| 2010/0079042 A1 | 4/2010 | Eilers et al. | |
| 2010/0090567 A1 | 4/2010 | Felice | |
| 2012/0169196 A1 | 7/2012 | Marchetti | |

FOREIGN PATENT DOCUMENTS

| | | |
|---|---|---|
| EP | 0261083 | 9/1989 |
| EP | 0744152 | 2/1999 |
| EP | 2702899 | 3/2014 |
| JP | 2003041810 A | 2/2003 |
| JP | 2008178562 | 8/2008 |
| JP | 2008183111 | 8/2008 |
| JP | 2013189819 A | 9/2013 |
| KR | 101226843 B1 | 1/2013 |

OTHER PUBLICATIONS

English translation of KR101226843B1, Jan. 25, 2013, obtained from https://patents.google.com/patent/KR101226843B1/en?oq=KR101226843 accessed on Oct. 5, 2018.
English translation of JP2003041810A, Feb. 13, 2003, obtained from https://patents.google.com/patent/JP2003041810A/en?oq=JP2003041810A accessed on Oct. 5, 2018.
English translation of CN203908400U, Oct. 29, 2014, obtained from https://patents.google.com/patent/CN203908400U/en?oq=CN203908400 accessed on Oct. 5, 2018.
English translation of CN2193081Y, Mar. 29, 1995, obtained from https://patents.google.com/patent/CN2193081Y/en?oq=CN2193081Y accessed on Oct. 5, 2018.
English translation of JP2013189819A, Sep. 26, 2013, obtained from https://patents.google.com/patent/JP2013189819A/en?oq=JP2013189819 accessed on Oct. 5, 2018.

\* cited by examiner

AIRCRAFT CABINET WITH DETACHABLE OUTER PANELS AND ATTACHEMENT MECHANISM THEREFOR

CROSS-REFERENCE TO RELATED APPLICATIONS

This application claims priority from U.S. provisional application No. 62/073,175 filed Oct. 31, 2014, the entire contents of which are incorporated by reference herein.

FIELD OF THE APPLICATION

The application relates generally to aircraft cabin interiors and, more particularly, to aircraft cabinets.

BACKGROUND OF THE ART

Aircraft cabinets are typically manufactured from a plurality of panels that are cut to size and then assembled to verify the fit. The panels are then partially disassembled to separate the cabinet in several portions which undergo various finishing operations, including for example the application of a veneer layer, of a laminate layer, of a leather or fabric layer, of paint or varnish, etc. Once all the portions have the desired surface finish, the cabinet is reassembled and installed in the aircraft. Repairs to the cabinet typically require the entire cabinet to be removed from the aircraft, which in most cases requires the removal of portions of the aircraft interior, thus requiring significant down time.

SUMMARY OF THE APPLICATION

In one aspect, there is provided a cabinet for installation in an aircraft having a plurality of visible surfaces configured to be apparent when the cabinet is installed in the aircraft. The cabinet comprises a shell and an outer panel. The shell defines a load-bearing structure of the cabinet. The outer panel is configured to be detachably connected to the shell for defining at least a part of the visible surfaces of the cabinet. The outer panel is configured to be detachably connected to the shell in a stationary position relative to the shell through engagement of complementary attachment members respectively attached to the outer panel and to the shell, the complementary attachment members allowing an adjustment of the stationary position of the outer panel relative to the shell when the outer panel is detached from the shell.

In a particular embodiment, the outer panel is part of a plurality of outer panels configured to be detachably connected to the shell, the outer panels each defining a respective part of the visible surfaces of the cabinet. In a particular embodiment, another or other one(s) of these outer panels is/are configured to be detachably connected to the shell in a stationary position relative to the shell through engagement of complementary attachment members respectively attached to the second outer panel and to the shell, the complementary attachment members allowing an adjustment of the stationary position of the other outer panel(s) relative to the shell when the other outer panel(s) is/are detached from the shell.

In a particular embodiment, the adjustment is defined at least along a direction perpendicular to an inner surface of the outer panel which faces the shell when the outer panel is detachably connected to the shell. In a particular embodiment, the adjustment is defined only along that direction.

In a particular embodiment, the outer panel(s) connected to the shell through engagement of the complementary attachment members is/are also connected through at least one fastener spaced apart from the complementary attachment members.

In a particular embodiment, the shell includes a plurality of interconnected shell panels defining inner surfaces of the cabinet, and the outer panel(s) cover and conceals at least one of the shell panels.

In a particular embodiment, the cabinet further comprises at least one door hingedly connected to the outer panel, so that the door is connected to the shell only through the outer panel.

In a particular embodiment, the complementary attachment members include a first attachment member having a portion with an adjustable position relative to the outer panel or to the shell, and a second attachment member detachably engaged to the portion of the first attachment member. In a particular embodiment, the portion of the first attachment member is adjustable with respect to the shell, and the second attachment member is connected to the outer panel with a fixed position relative thereto.

In a particular embodiment the second attachment member is a female attachment member and the first attachment member is a male attachment member. The female attachment member has a slot having an entry portion and a retention portion. The male attachment member includes a base and the portion of the male attachment member includes a pin support and a pin extending from the pin support. The pin has an elongated body and an enlarged head retained at an end of the body opposite the pin support. The body is sized to be insertable through the slot. The enlarged head is sized to be insertable in the entry portion of the slot and retained in the retention portion of the slot. The pin support is engaged to the base with a position of the pin support relative to the base being adjustable along a direction of a central longitudinal axis of the pin.

In a particular embodiment, a kit includes the cabinet and further comprises at least one additional outer panel. Each additional outer panel is configured for detachable connection to the shell interchangeably of a respective one of the outer panels.

In another aspect, there is provided a method of manufacturing a cabinet for installation in an aircraft, the method comprising: manufacturing a shell defining a load-bearing structure of the cabinet; manufacturing an outer panel independently from the shell, including applying a surface finish on at least one outer surface of the outer panel; and detachably connecting each outer panel to the shell such that the outer surface(s) of the outer panel define visible surface(s) of the cabinet. The step of detachably connecting includes: determining a required position of the outer panel relative to the shell; adjusting at least one of two complementary attachment members respectively attached to the outer panel and to the shell to select the required position of the outer panel between a plurality of possible positions; and engaging the complementary attachment members to one another to connect the outer panel to the shell at the required position.

In a particular embodiment, the at least one outer panel is part of a plurality of outer panels configured to be detachably connected to the shell, and the method comprises manufacturing the plurality of outer panels independently from the shell, including applying a surface finish to each outer surface of the plurality of outer panels.

In a particular embodiment, manufacturing the plurality of outer panels includes manufacturing adjacent outer panels by applying the surface finish on a panel of material, and cutting the panel of material after application of the surface finish to define the adjacent outer panels.

In a particular embodiment, the outer panel covers an outer surface of the shell when the outer panel is connected to the shell, and determining the required position of the outer panel relative the shell includes determining a required distance between the outer panel and the outer surface of the shell.

In a particular embodiment, the step of detachably connecting further includes detachably connecting the outer panel to the shell through at least one fastener spaced apart from the complementary attachment members.

In a particular embodiment, the method further comprises hingedly attaching a door to the outer panel, so that the door is connected to the shell only through that outer panel.

In a particular embodiment, the complementary attachment members include first and second attachment members. Adjusting at least one of the complementary attachment members includes adjusting a position of a portion of the first attachment member relative to the shell. Engaging the complementary attachment members to one another includes detachably engaging the portion of the first attachment member to the second attachment member. The second attachment member is connected to the outer panel with a fixed position relative thereto.

In a further aspect, there is provided an attachment mechanism for detachably connecting two panels with an adjustable stationary relative position. The mechanism comprises a female attachment member and a male attachment member. The female attachment member has a slot having an entry portion and a retention portion. The male attachment member includes a base, a pin support and a pin extending from the pin support. The pin has an elongated body and an enlarged head retained at an end of the body opposite the pin support. The body is sized to be insertable into the slot. The enlarged head is sized to be insertable in the entry portion of the slot and retained in the retention portion of the slot. The pin support is engaged to the base with a position of the pin support relative to the base being adjustable along a direction of a central longitudinal axis of the pin.

In a particular embodiment, the pin is slidingly received in the pin support to be slidable along the direction of the central longitudinal axis of the pin between an extended position and a retracted position, and the pin is biased toward the extended position.

In a particular embodiment, the pin support has an open cavity defined therein. A bottom wall of the cavity has an opening defined therein concentric with the cavity. The cavity is sized to receive the enlarged head of the pin, and the opening is sized to receive the body of the pin while preventing the enlarged head from passing therethrough. The pin includes an enlarged end opposite the enlarged head, and the opening is sized to prevent the enlarged end from passing therethrough. The pin extends through the cavity and opening with the enlarged head and enlarged end being on opposite sides of the bottom wall of the cavity. The pin is biased toward the extended position by a spring received within the cavity around the body of the pin, the spring extending between the enlarged head and the bottom wall of the cavity.

In a particular embodiment, the pin support has a cylindrical body defining a threaded outer surface, which is threadingly engaged with a threaded inner surface of a cylindrical cavity defined in the base. The pin extends concentrically with the pin support. The position of the pin support is adjustable relative to the base through a relative rotation of the threaded surfaces creating a movement of the pin support with respect to the base along the direction of the central axis of the pin support.

BRIEF DESCRIPTION OF THE DRAWINGS

Reference is now made to the accompanying figures in which:

FIG. 4b is a schematic plan view of a male attachment member in accordance with a particular embodiment, complementary to the female attachment member of FIG. 4a;

DETAILED DESCRIPTION

Figure 1:
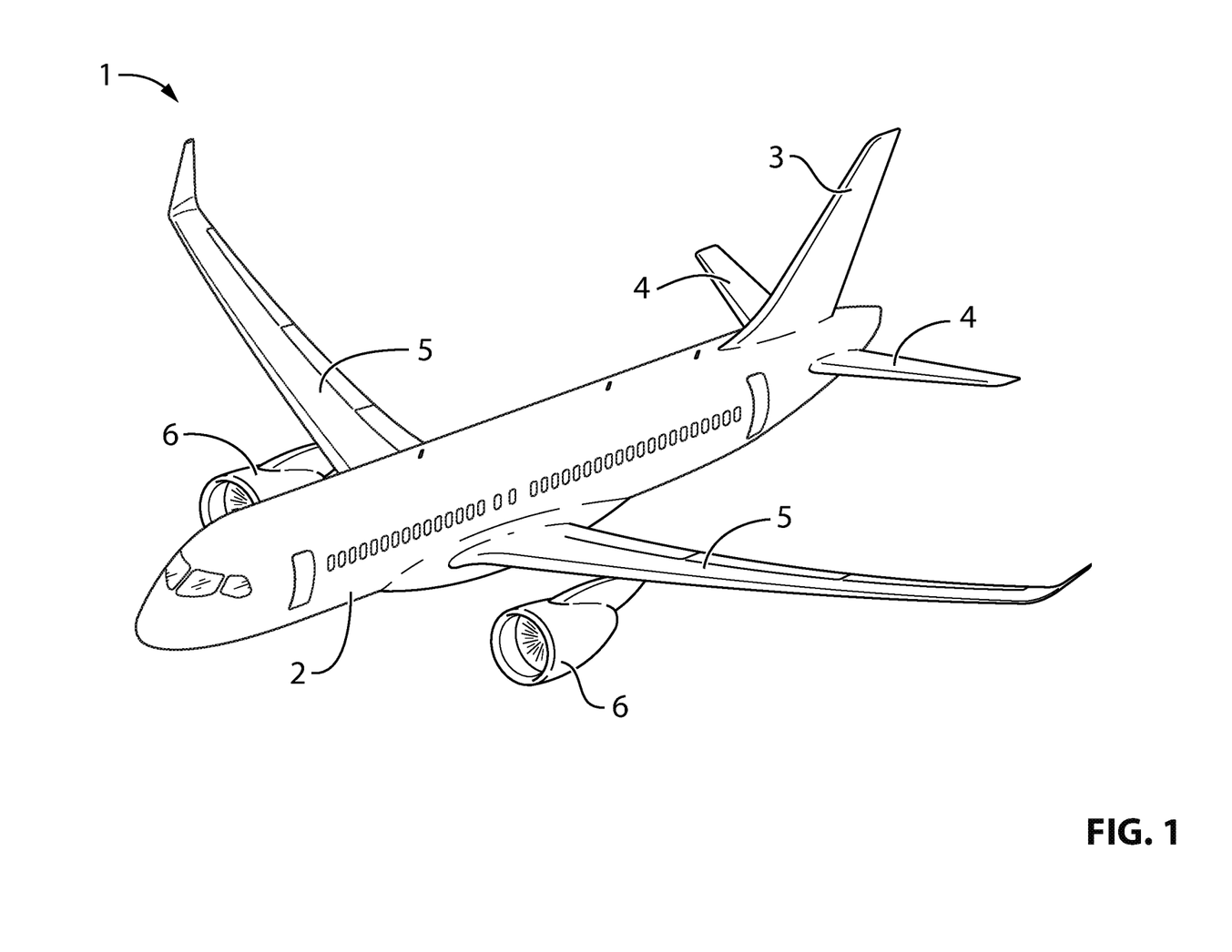
FIG. 1 is a schematic tridimensional view of an aircraft.

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

Figure 2:
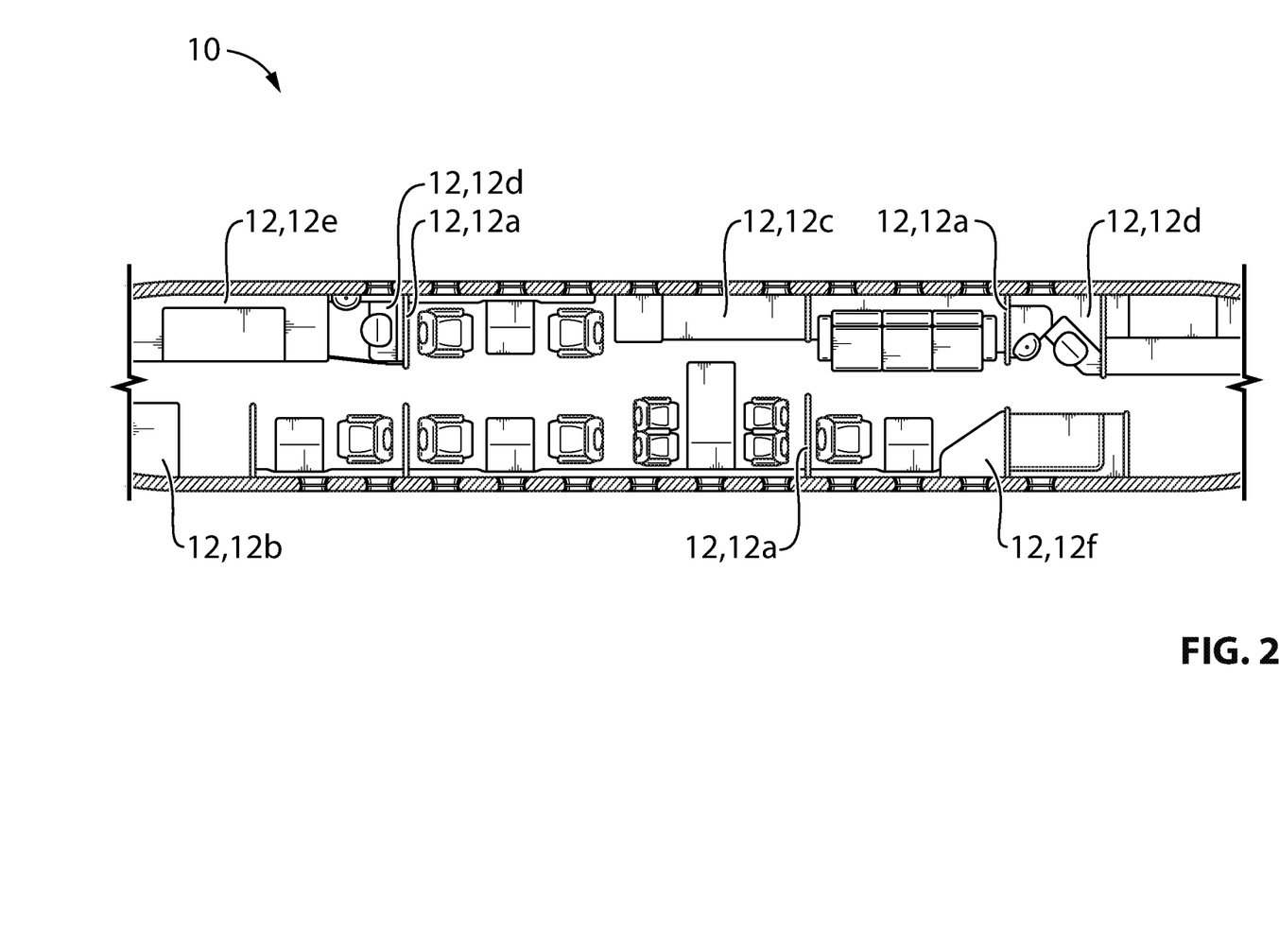
FIG. 2 is a schematic floor plan of a cabin interior of an aircraft.

Referring to FIG. 2, an example interior layout of an aircraft cabin 10 is shown. The cabin 10 includes a plurality of cabinets 12. The term "cabinet" is intended to include, but not be limited to, any structure within the cabin 10 having visible surfaces, including, but not limited to, a bulkhead divider 12a, a wardrobe 12b, a credenza 12c, a lavatory structure 12d, a galley 12e, an entertainment unit 12f, a storage unit, a side ledge dado, a crew area, an annex, a table, a shower, a bed, a divan end cabinet, etc. Cabinets 12 may include one or more doors and/or one or more drawers and/or one or more internal dividers, e.g. shelves.

Each cabinet 12 is mounted to one or more structural component(s) of the aircraft 1, for example mounted to a wall structure and/or a floor structure of the aircraft 1. Each cabinet 12 thus has one or more hidden surface(s) which rest against the aircraft structure and are non-visible when the cabinet 12 is installed in the aircraft 1. The other surfaces of the cabinet 12 are visible surfaces, i.e. surfaces which are apparent or exposed when the cabinet 12 is installed in the aircraft 1. The visible surfaces thus define the "look" of the cabinet 12, and as such have a predetermined surface finish, which may differ between surfaces of the same cabinet 12 depending on the selected design.

Figure 3A:
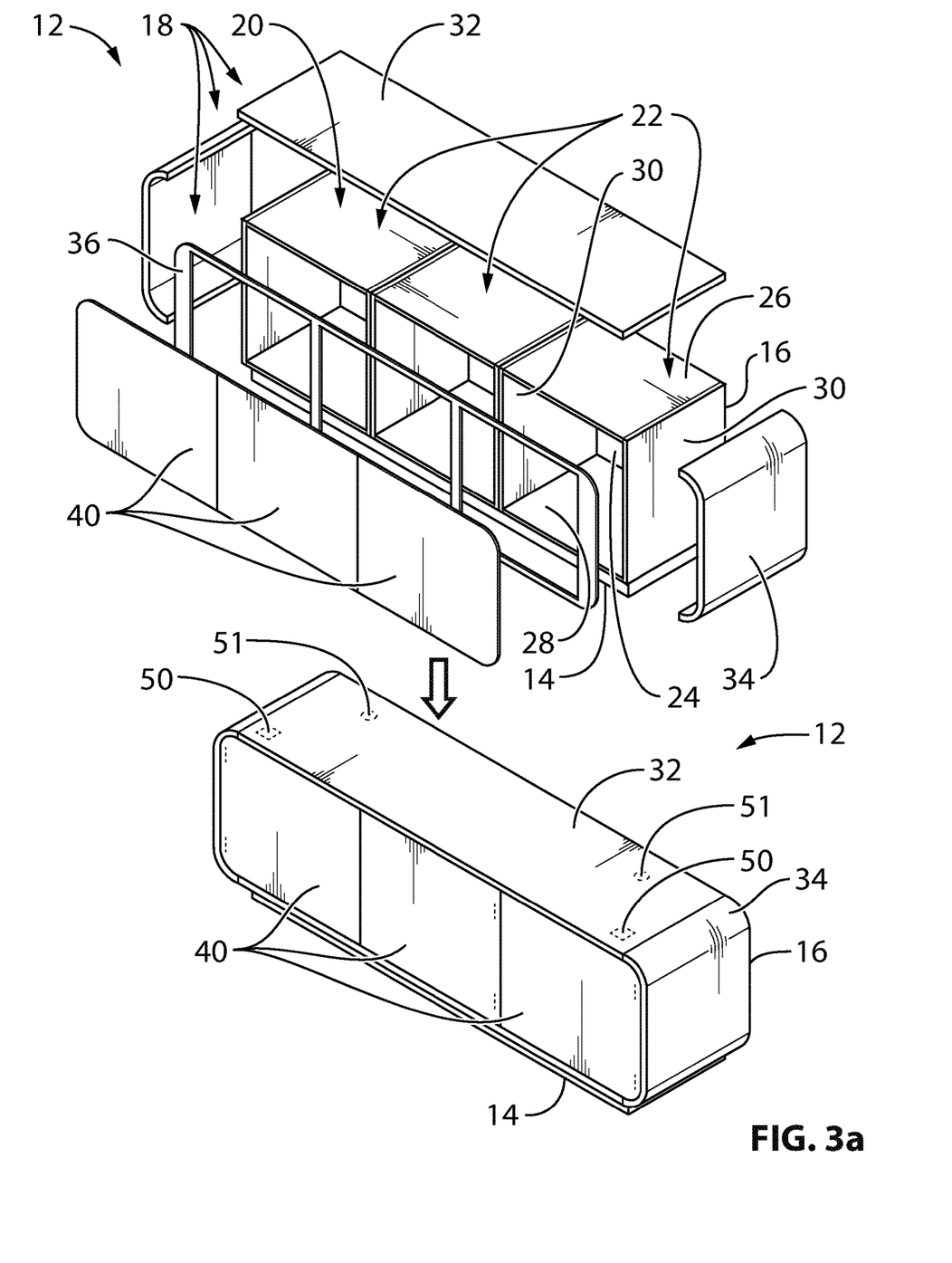
FIGS. 3a and 3b are schematic tridimensional views of cabinets which may be used in an aircraft cabin such as shown in FIG. 2, in accordance with particular embodiments, showing each cabinet in an exploded and an assembled view.

Referring to FIG. 3a, a cabinet 12 in accordance with a particular embodiment is schematically shown. This cabinet 12 is intended to rest on or be attached to a floor surface of the aircraft and to be attached to a wall structure of the aircraft, and accordingly has a bottom surface 14 and a rear surface 16 which are non-visible surfaces. Although the cabinet 12 is shown as a credenza, it is understood that any other alternate configuration for the cabinet 12 may be selected, including but not limited to the particular examples provided above.

The cabinet 12 generally includes a shell 20 and a plurality of outer panels 18. The shell 20 may be made of multiple units 22 (3 in the example shown) which may be manufactured separately and then interconnected. Such a modular approach can allow for the manufacture of cabinets having different widths from a limited number of unit sizes, which in a particular embodiment may reduce manufacturing costs and/or time. In an alternate embodiment, the shell 20 may be made from a single unit.

Each shell unit 22 may be formed in skeleton shape, as an assembly of interconnected elongated frame members (not shown), or each shell unit 22 may be formed by a plurality of interconnected shell panels as shown; a combination of both may also be used. In the embodiment shown, each shell unit 22 includes a rear shell panel 24 interconnected with opposed top and bottom shell panels 26, 28 and with opposed side panels 30, the top and bottom shell panels 26, 28 being also interconnected with the side shell panels 30. Each shell unit 22 has an open front, and the adjacent side shell panels 30 of the adjacent shell units 22 are interconnected to define the shell 20. Other configurations are also possible. In a particular embodiment, the shell panels 24, 26, 28, 30 are interconnected in a permanent manner using tongue and groove attachments secured by adhesive, for example. Alternately, the shell panels 24, 26, 28, 30 may be interconnected through any other adequate type of connection.

The shell 20 defines the load-bearing structure of the cabinet 12, and accordingly the elements composing it, whether panels or frame members, are sized in accordance with loads expected to be applied to the cabinet 12 during use, using any appropriate known technique. In a particular embodiment, the shell 20 is made of panels of composite material; examples of possible materials include, but are not limited to, epoxy glass, aramid fiber, aluminum and carbon. In embodiments where the shell 20 is made of assembled shell panels as shown, the inner surface of the shell panels 24, 26, 28, 30 defining the interior of the cabinet 12 may include any appropriate type of surface finish, for example paint, varnish, a layer of felt, etc.

Still referring to FIG. 3a, the outer panels 18 each define a respective part of the visible surfaces of the cabinet 12, and are manufactured separately from the outer shell 20. The outer panels 18 are not intended to be load-bearing, and are sized and configured in accordance with a desired look to be provided for the cabinet 12. In a particular embodiment, the outer panels 18 having little to no load-bearing functionality provide a significant reduction or elimination in the cracking of the surface finish in the visible surfaces, as compared with a prior cabinet with the surface finish provided directly on the load bearing structure.

Each outer panel 18 may be straight or may have a tridimensional shape; the outer panels may be for example curved in a single plane, curved following a compound curve, formed with intersecting surfaces, etc. The outer panels 18 have a surface finish on their outer, visible surface(s), which is selected according to the desired finished look for the cabinet 12. Examples of surface finishes include, but are not limited to, a veneer layer, one or more coats of varnish, one or more coats of paint, one or more coats of lacquer, a plastic layer, or combinations thereof; a layer of leather or fabric; a cushioning layer; etc.

Each outer panel 18 is configured to be detachably connected to the shell 20. It is understood that "detachably" is intended to encompass connections allowing removal of the outer panels 18 without tools, and connections requiring tools to remove the outer panels 18 (e.g. threaded fasteners), as long as the panels 18 can be removed and reinstalled without damage thereto. Some outer panels 18 may also be detachably connected to one another.

The outer panels 18 are connected in a stationary position with respect to the shell 20, i.e. each outer panel 18 is engaged to the shell 20 such as to remain in the same position or substantially the same position with respect thereto as long as the outer panel 18 remains engaged to the shell 20, although that same position may be adjustable, as will be further detailed below. In the embodiment shown, the outer panels 18 include a top outer panel 32 configured to cover and conceal the top shell panels 26, two side outer panels 34 each configured to cover and conceal one of the end side shell panels 30, and a front trim outer panel 36 configured to cover and conceal a front edge of the top, bottom and side shell panels 26, 28, 30 to surround door openings. Alternate configurations are also possible.

In the embodiment shown, a part of the visible surfaces of the cabinet 12 is also defined by front doors 40 that selectively open and close the open front of the cabinet 12. The doors 40 are preferably manufactured and finished at the same time as the outer panels 18, particularly when the doors 40 include the same surface finish as some or all of the outer panels 18. In a particular embodiment, each door 40 is hingedly connected to one of the outer panels 18 so that the only connection between the shell 20 and the door 40 is through that outer panel 18, i.e. the door 40 is not directly connected to the shell 20. In the embodiment shown, the doors 40 are hingedly connected to the front trim outer panel 36.

Figure 3B:
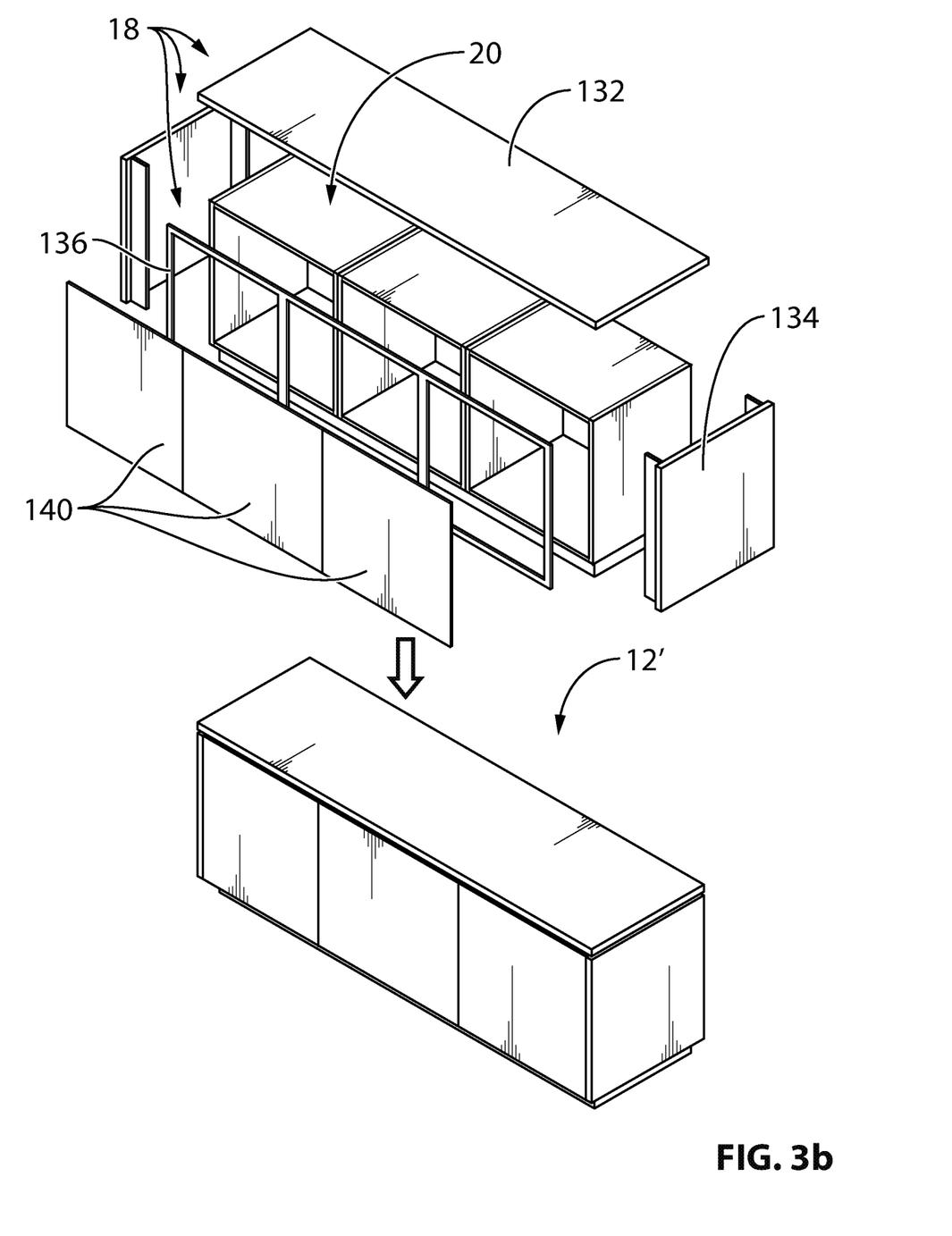

Referring to FIGS. 3a-3b, the detachable outer panels 18 may allow for cabinets having different "looks" to be manufactured from the same shell 20 through variations in the shape and/or surface finish of the outer panels 18 connected thereto. In FIG. 3a, the side outer panels 34 have a curved, C-shaped profile with top and bottom curved ends, and the front trim outer panel 36 includes rounded corners, thus producing a cabinet 12 having a rounded shape; in FIG. 3b, the side outer panels 134 have a straight, bracket-shaped profile with front and rear folded ends, and the front trim outer panel 136 includes perpendicular corners, thus producing a cabinet 12' having a rectangular shape using the same shell 20 as the cabinet 12 of FIG. 3a. The top outer panels 32, 132, side outer panels 34, 134, front trim outer panels 36, 136 and/or doors 40, 140 of the two cabinets 12, 12' may have different surface finishes from one another. In a particular embodiment, such interchangeability allows for a simplification in the engineering of the cabinets through the use of same load-bearing structure (shell 20) for multiple designs. Such interchangeability may also allow for a user to change the look or style of a cabinet without replacing the entire cabinet or removing it from the aircraft. Such interchangeability also allows for relatively quick replacement or maintenance of a damaged outer panel without having to remove the entire cabinet from the aircraft, which may significantly reduce down time associated with such changes and/or repairs.

The cabinet 12 may thus be provided in a kit with the shell 20 and outer panels 18, and with one or more additional outer panel(s) each interchangeable with one of the original outer panels, for example identical thereto for eventual repair purposes, or with a different shape and/or surface finish for eventual style variation.

At least one, and in a particular embodiment all, of the outer panels 18 is/are detachably connected to the shell 20 through engagement of complementary attachment members defining an attachment mechanism 50 allowing an adjustment of the stationary position of the outer panel 18 relative to the shell 20. The adjustment is preferably performed when the outer panel 18 is detached from the shell 20, although it is understood that some configurations of attachment members can also allow an adjustment when the outer panel 18 is attached to the shell 20. In a particular embodiment, the adjustment includes an adjustment defined along a direction transverse, and in a particular embodiment perpendicular, to an inner surface of the outer panel 18 facing the shell 20, such as to be able to adjust a spacing between the outer panel 18 and the portion (e.g. surface of the shell panel) of the shell 20 concealed by the outer panel. Other types of adjustment may also be possible, for example lateral adjustment along a plane of the inner surface of the outer panel 18 facing the shell 20.

It is understood that the cabinet 12 may include a plurality of outer panels 18 with only some of which being connected with such an adjustment. For example, only one of a plurality of outer panels 18 may be adjustable. Also, some cabinets 12 may include only a single outer panel 18, depending on their configuration.

The attachment mechanism 50 providing for the adjustment can be used in combination with another type of detachable attachments 51, for example complementary threaded fasteners. In a particular embodiment and with reference to FIG. 3a, the outer panel 18 is connected to the shell through engagement of one or more attachment mechanisms 50 allowing adjustment, and is detachably connected to the shell 20 through one or more other detachable attachments 51 spaced apart from the attachment mechanisms 50. For example, attachment mechanisms 50 may be provided adjacent one edge of the outer panel 18 and the other detachable attachments 51 may be provided adjacent an opposed edge of the outer panel 18. Shims or the like may be provided between the outer panel 18 and the shell 20 adjacent the other detachable attachments 51 to bridge a gap defined by the adjusted attachment mechanisms 50.

Figure 4A:
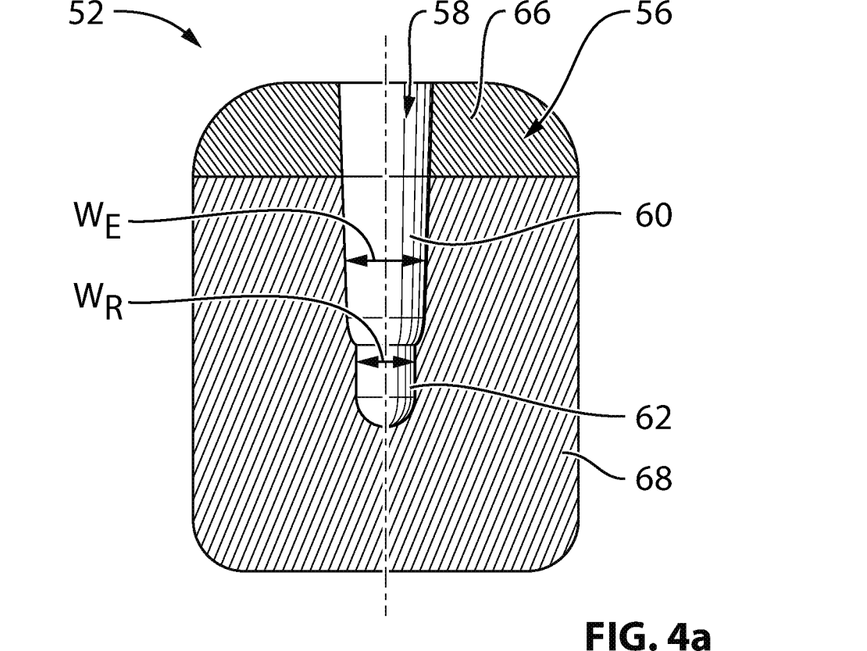
FIG. 4a is a schematic plan view of a female attachment member in accordance with a particular embodiment, which may be used to attach outer panels of a cabinet such as shown in FIGS. 3a-3b.
Figure 4B:
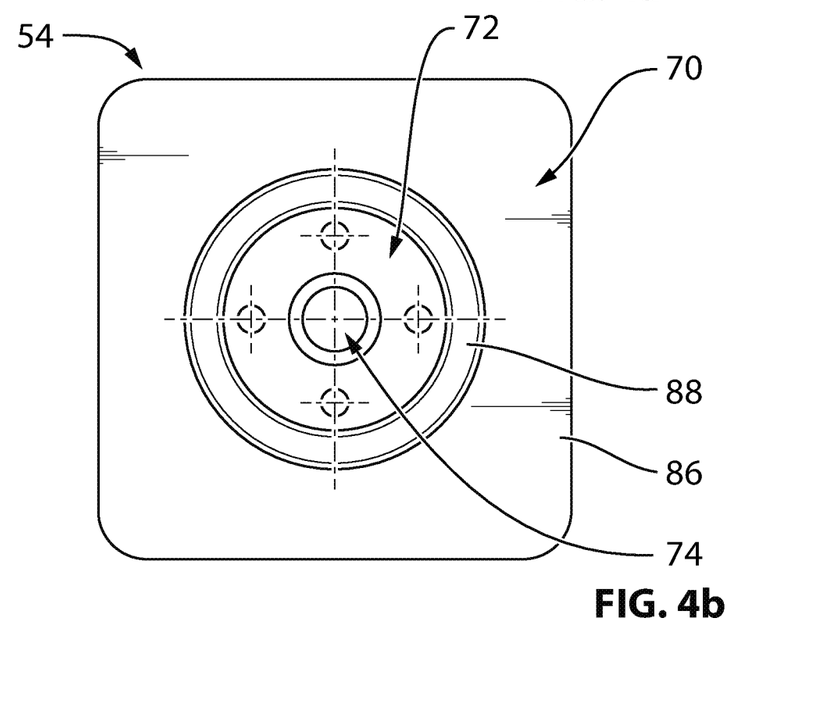
Figure 5:
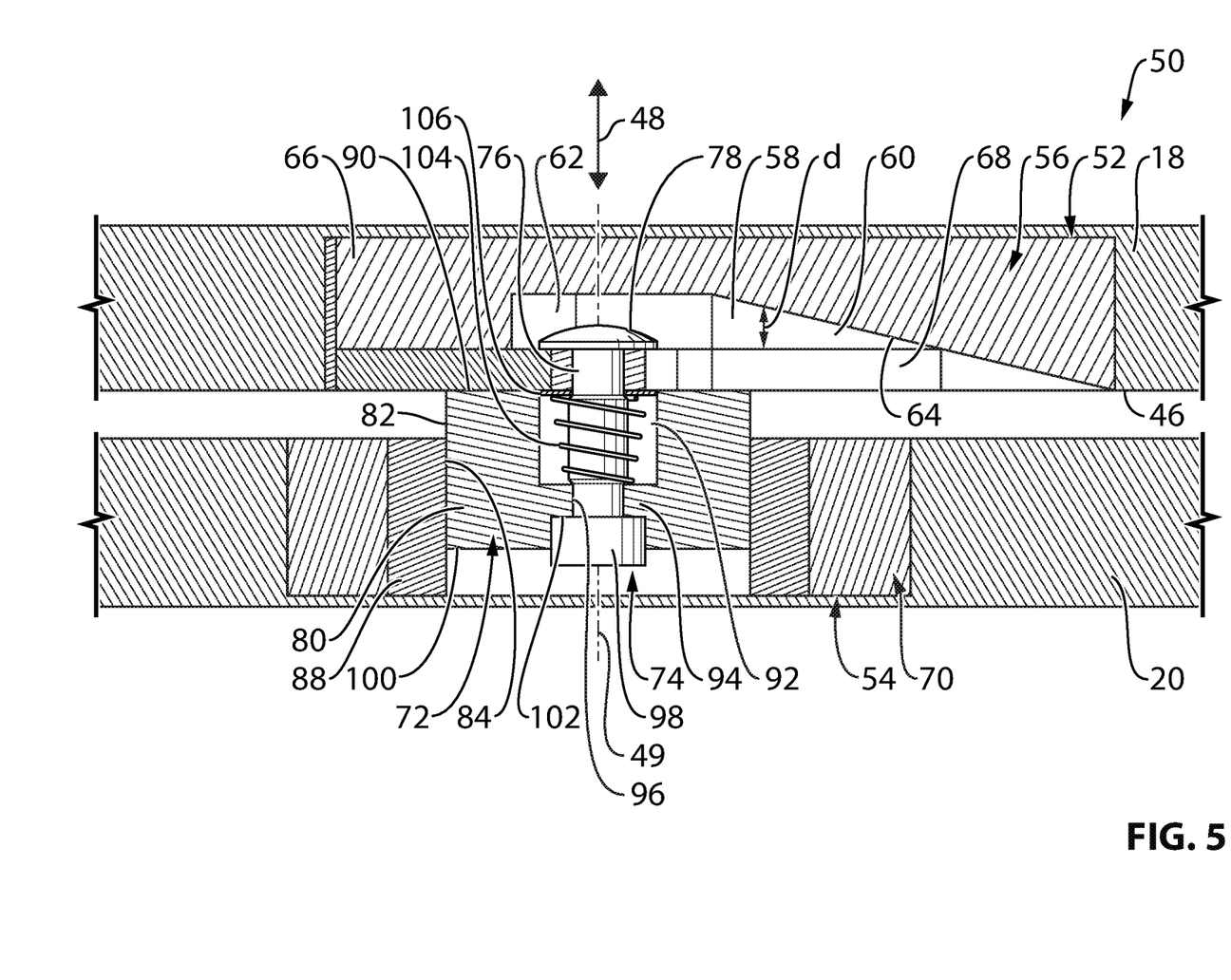
FIG. 5 is a schematic cross-sectional view of an outer panel and shell attached with the attachment members of FIGS. 4a-4b.

Referring to FIGS. 4a-b and 5, an example of the attachment mechanism 50 according to a particular embodiment is shown. The attachment mechanism 50 provides an adjustment along the direction 48 transverse, and in a particular embodiment perpendicular, to the inner surface 46 of the outer panel 18 facing the shell 20 (see FIG. 5). It is understood that other configurations of attachment mechanisms allowing such an adjustment may alternately be used, and that alternate adjustment mechanisms may allow for additional adjustments in other directions.

In the embodiment shown, the attachment mechanism 50 includes complementary attachment members in the form of a female attachment member 52 (FIG. 4a) and a male attachment member 54 (FIG. 4b). In the embodiment shown, the female attachment member 52 is connected to the outer panel 18 in a fixed position relative thereto (e.g. through insertion in a complementary-shaped hole of the outer panel 18 and retained therein using adhesive) and the male attachment member 54 is connected to the shell 20 in a fixed position relative thereto (e.g. through insertion in a complementary-shaped hole of the shell 20 and retained therein using adhesive). It is understood that alternately the female attachment member 52 may be connected to the shell 20 and the male attachment member 54 may be connected to the outer panel 18.

Referring to FIG. 4a, the female attachment member 52 has a base 56 connected to the outer panel 18 in a fixed position relative thereto, in which is defined a slot 58 shaped for engagement, for example a keyhole slot. The slot 58 has an entry portion 60, and a retention portion 62 having a width $W_R$ smaller than the width $W_E$ of the entry portion 60. The width $W_E$ of the entry portion 60 may progressively reduce toward the retention portion 62, for example to help guide the male attachment member into the retention portion 62. As can be seen in FIG. 5, the entry portion 60 of the slot 58 may have a sloped inner surface 64, defining a smallest slot depth d opposite the retention portion 62 and a greatest slot depth d adjacent the retention portion 62, with the inner surface 64 defining a constant depth d in the retention portion 62. The sloped inner surface 64 may also help guide the male attachment member into the slot 58. Alternately, the slot 58 may have a constant depth d.

In a particular embodiment, the base 56 includes a body 66 made of dense plastic (e.g. Duratron®) or dense polymer foam in which is machined a slot having a width at least equal to that of the slot 58, and a metal plate 68 (e.g. aluminum alloy) adhered to the outer surface of the body 66 and defining the slot 58 in alignment with the slot of the body 66. Alternately, the base 56 can be made in monolithic form, for example of metal.

Referring to FIG. 5, the male attachment member 54 includes two portions which have an adjustable but in use stationary position relative to one another, providing for the adjustment of the attachment mechanism 50. The first portion includes a base 70, which is connected to the shell 20 in a fixed position relative thereto. The second portion, which has an adjustable position with respect to the base 70 (and as such with respect to the shell 20) and is engaged to the female attachment member 52, includes a pin support 72 and a pin 74. Although the pin 72 is shown as cylindrical, it is understood that other shapes are alternately possible.

The pin 74 extends from the pin support 72, and has an elongated body 76 and an enlarged head 78 retained at one end of the body 76 opposite the pin support 72. The body 76 is sized to be insertable through the slot 58. The pin head 78 is sized to be insertable in the entry portion 60 of the slot 58 and retained in the retention portion 62 of the slot 58. In the particular embodiment shown, the body 76 and pin head 78 are threadingly engaged to one another.

The pin support 72 is engaged to the base 70 with a position of the pin support 72 relative to the base 70 being adjustable along the direction 48 of the central longitudinal axis 49 of the pin 74. The pin support 72 is however engaged to the base 70 such as to be able to remain stationary relative thereto when the attachment members 52, 54 when the pin head 78 is engaged in the slot 58. The pin support 72 abuts the surface of the female attachment member 52 when the pin head 78 is engaged in the slot 58.

In the embodiment shown, the pin support 72 has a cylindrical body 80 defining a threaded outer surface 82, and the base 70 includes a cylindrical cavity defining a complementary threaded inner surface 84. The pin support 72 is thus threadingly engaged to the base 70, so that a relative rotation of the threaded surfaces 82, 84 creates a movement of the pin support 72 with respect to the base 70 along a central axis 49 of the pin support 72, which corresponds to the central axis of the pin 74 extending concentrically with the pin support 72. In a particular embodiment, the base 70 and pin support 72 are sized to allow an adjustment of at least 0.0140 inch along the central axis 49. In another embodiment, the base 70 and pin support 72 are sized to allow an adjustment of up to 0.5 inch along the central axis 49. The threaded engagement allows the pin support 72 and base 70 to maintain a relative stationary position after adjustment to the desired position.

In an alternate embodiment, the pin 74 may be engaged eccentrically with the pin support 72, so that the movement of the pin support 72 along its central axis creates a movement of the pin 74 both along and transversely to the central axis 49 of the pin, for lateral adjustment.

In a particular embodiment, the base 70 has a body 86 made of dense plastic (e.g. Duratron®) or dense polymer foam and a metal insert 88 defines the threaded inner surface 84, with the pin support 72 and pin 74 being also made of metal. Alternately, the base 70 can be made in monolithic form, for example of metal.

In the embodiment shown and still referring to FIG. 5, the pin 74 is slidingly received in the pin support 72 to be slidable along the direction of the central longitudinal axis 49 of the pin 74. The pin 74 is slidable between an extended position where the pin head 78 is furthest from the pin support 72, and a retracted position. The pin 74 is biased toward the extended position. In a particular embodiment, such a pin configuration may facilitate insertion of the pin 74 within the slot 58: when the outer panel 18 is brought in proximity of the shell 20, the pin 74 is pushed toward the retracted position through contact with the outer panel 18, and the bias causes the pin 74 to automatically extend when it slides out of contact with the surface of the outer panel 18 or metal plate 68 and becomes aligned with the slot 58.

The pin support 72 has a contact surface 90 adapted to contact the metal plate 68 of the male attachment member 54. An open cavity 92 is defined in the contact surface 90, with a bottom wall 94 of the cavity including an opening 96 concentric with the cavity 92. The cavity 92 is sized to receive the head 78 of the pin 74 and the opening 96 is sized to receive the body 76 of the pin 74 while preventing the pin head 78 from passing therethrough. The pin 74 includes an enlarged end 98 opposite the pin head 78, which is larger than the opening 96 and as such unable to passing therethrough. For example, the pin 74 may be defined by a screw with the screw head defining the pin end 98, and the pin head 78 being defined by a threaded nut engaged at the end of the screw.

The pin 74 extends through the cavity 92 and opening 96 with the pin head 78 and pin end 98 being on opposite sides of the bottom wall 94 of the cavity 92. The surface 100 of the pin support 72 opposite the contact surface 90 may include a shoulder 102 around the opening 96 to abut with the pin end 98. In the extended position shown in FIG. 5, the pin end 98 rests against the shoulder 102 and the pin head 78 extends out of the cavity 92. In the retracted position, the pin head 78 may be partially or completely received in the cavity 92. A spring 104 is located in the cavity 92 around the body 76 of the pin 74, extending between the pin head 78 and the bottom wall 94 of the cavity 92 to provide the bias toward the extended position. A washer 106 may be provided between the pin head 78 and the spring 104 to maintain engagement of the spring 104 in the cavity 92; the washer 106 may be omitted if the pin head 78 is sized and positioned to keep the spring 104 enclosed in the cavity throughout the range of motion of the pin 74.

In an alternate embodiment which is not shown, the pin 74 may extend rigidly from the pin support 72.

In a particular embodiment, the cabinet 12 is thus manufactured by manufacturing the shell 20 defining the load-bearing structure of the cabinet, and manufacturing the outer panels 18, including applying the required surface finish, independently from the shell 20. The outer panels 18 may thus be manufactured and finished in parallel of the manufacturing of the load-bearing shell 20, which in a particular embodiment significantly reduces the time required for manufacturing the cabinet 12 as a whole.

Figure 6:
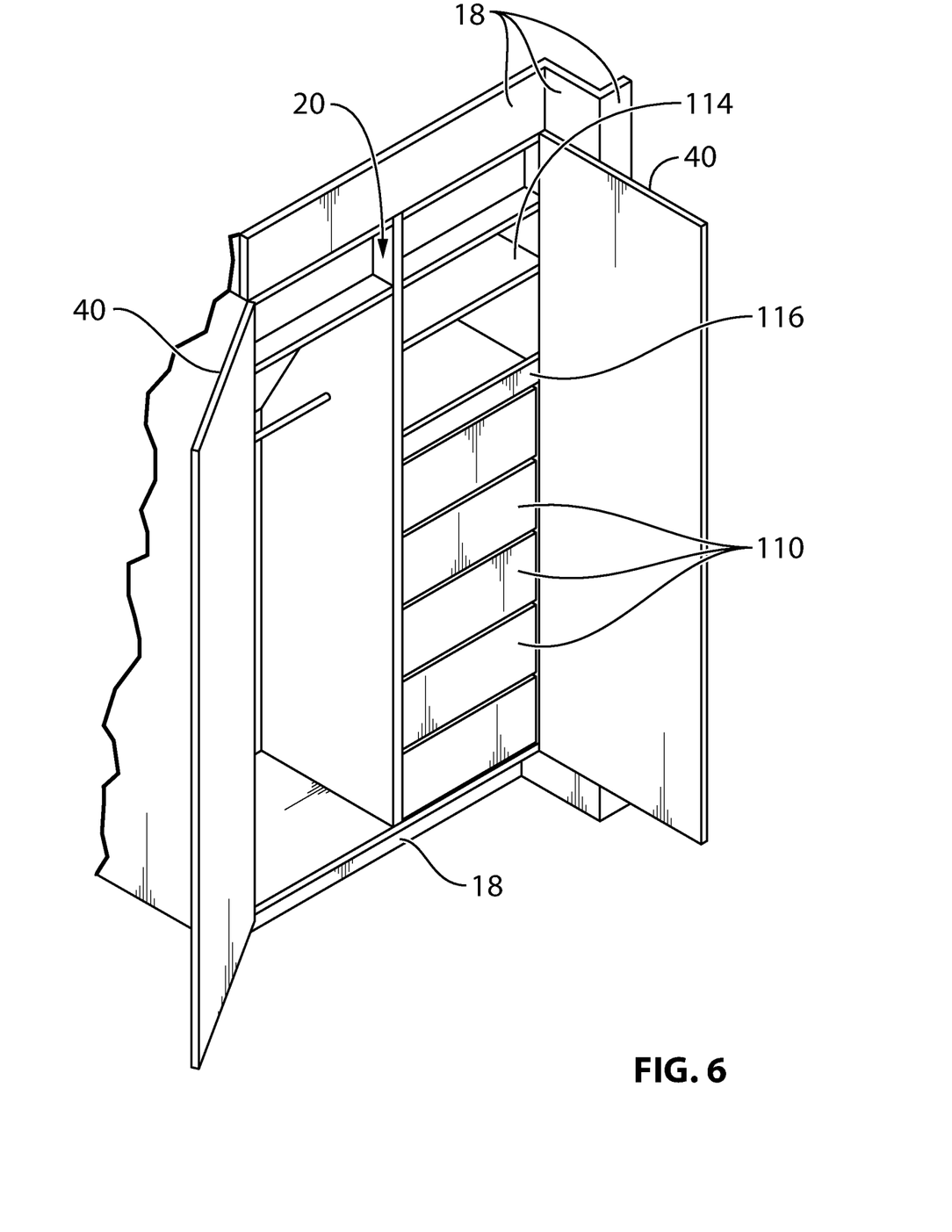
FIG. 6 is a schematic tridimensional view of a cabinet which may be used in an aircraft cabin such as shown in FIG. 2, in accordance with another particular embodiment.

Referring to FIG. 6, in a particular embodiment, the cabinet includes other elements requiring a surface finish different from that of the inner surfaces of the cabinet which are defined by the shell 20. Example of such elements include, but are not limited to, drawer faces 110, external doors 40, internal doors (not shown), removable shelves 114, internal trim 116 attached to one or more element(s) of the shell, for example to an exposed edge of the shell 20. In a particular embodiment, these elements are manufactured and finished separately from the outer shell 20, and preferably together with the outer panels 18.

Figure 7:
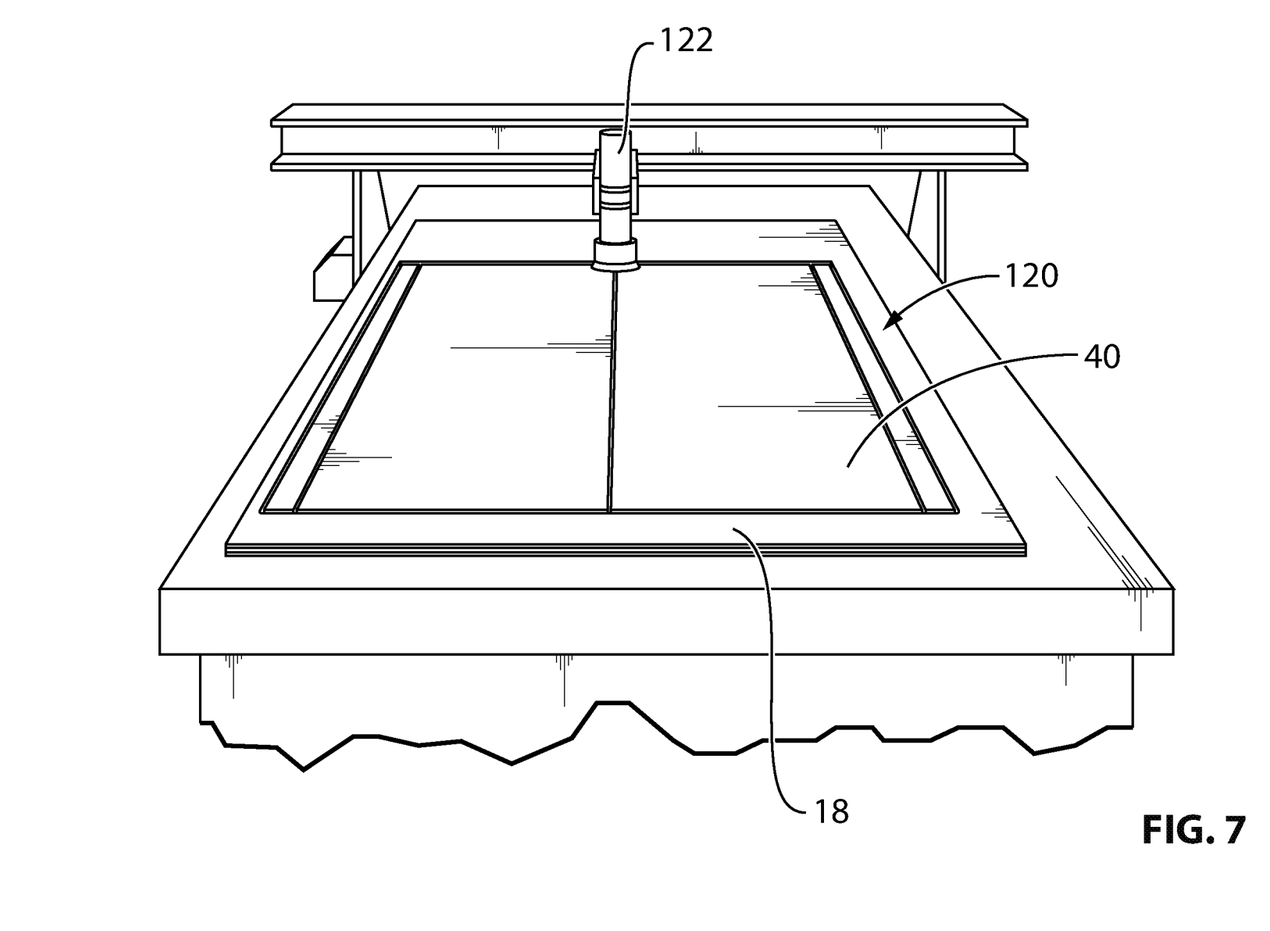
FIG. 7 is a tridimensional view of a machining step for outer panels or other finished elements of a cabinet such as shown in FIGS. 3a-3b and 6, in accordance with a particular embodiment.

In a particular embodiment and as shown in FIG. 7, adjacent elements (e.g. adjacent outer panels, adjacent doors, adjacent outer panels 18 and doors 40, adjacent drawer faces) are manufactured from a same panel 120 of material. The surface finish is applied to the panel 120 of material, and the finished panel 120 is then cut, preferably using a CNC machine 122, to define the separate elements. One or more additional finishing steps (e.g. final coat of varnish) may then be applied to the separate elements if required; in a particular embodiment, all the finishing steps are applied to the panel 120 prior to being separated into the elements. The front trim outer panels and doors of FIG. 3*a* or 3*b*, the adjacent outer doors and door trim of FIG. 6, the adjacent drawer faces of FIG. 6, etc. may be manufactured using this method. In a particular embodiment, such a method ensures that any pattern in the surface finish (e.g. wood grain) is continuous between adjacent surfaces of different elements. Although the panel 120 of material shown is straight, it is understood that a similar process could be applied to a curved panel, for example defining a side outer panel and a front door adapted to be hingedly connected to the side outer panel adjacent its front edge.

Once the outer panels 18 have the desired surface finish, the outer panels 18 are then detachably connected to the shell 20 to define visible surfaces of the cabinet 12. At least one, and in a particular embodiment all, of the outer panels 18 is/are connected by determining its required position relative to the shell 20, adjusting one of the complementary attachment members 52, 54 of the outer panel 18 and shell 20 to select the required position, and then engaging the complementary attachment members 52, 54 to one another so that the outer panel 18 is connected to the shell 20 in the required position. As detailed above, the determination of the required position of the outer panel 18 includes in one embodiment the determination of a required spacing between the outer panel 18 and the outer surface of the shell panel 24, 26, 28, 30 concealed by the outer panel 18.

The adjustment may include, as detailed above, adjusting the relative positions of two portions of one of the attachment members (e.g. adjusting the relative position of the pin support 72 and base 70 of male attachment member 54).

Attaching each outer panel 18 with the complementary attachment members 52, 54 may be done in combination with detachably connecting the outer panel 18 to the shell 20 using one or more fasteners spaced apart from the attachment members 52, 54.

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A cabinet for installation in an aircraft, the cabinet having a plurality of visible surfaces configured to be apparent when the cabinet is installed in the aircraft, the cabinet comprising:
   a shell defining a load-bearing structure of the cabinet; and
   an outer panel detachably connected to the shell for defining at least a part of the visible surfaces of the cabinet;
   wherein:
      the outer panel is configured to be detachably connected to the shell in a stationary position relative to the shell through engagement of complementary attachment members respectively attached to the outer panel and to the shell, the complementary attachment members allowing an adjustment of the stationary position of the outer panel relative to the shell when the outer panel is detached from the shell;
      the complementary attachment members include:
         a first attachment member having a portion adjustable relative to the outer panel or to the shell; and
         a second attachment member detachably engaged to the portion of the first attachment member; and
      the portion of the first attachment member has an adjustable position with respect to the shell, and the second attachment member is connected to the outer panel with a fixed position relative thereto.

2. The cabinet as defined in claim 1, wherein the outer panel is part of a plurality of outer panels each configured to be detachably connected to the shell, the plurality of outer panels each defining a respective part of the visible surfaces of the cabinet.

3. The cabinet as defined in claim 2, wherein the outer panel is a first outer panel, the plurality of outer panels including at least one second outer panel configured to be detachably connected to the shell in a stationary position relative to the shell through engagement of additional complementary attachment members respectively attached to the at least one second outer panel and to the shell, the additional complementary attachment members allowing an adjustment of the stationary position of the at least one second outer panel relative to the shell when the at least one second outer panel is detached from the shell.

4. The cabinet as defined in claim 1, wherein the adjustment is defined at least along a direction perpendicular to an inner surface of the outer panel, the inner surface facing the shell when the outer panel is detachably connected to the shell.

5. The cabinet as defined in claim 1, wherein the adjustment is defined only along a direction perpendicular to an inner surface of the outer panel, the inner surface facing the shell when the outer panel is detachably connected to the shell.

6. The cabinet as defined in claim 1, wherein the outer panel is connected to the shell through engagement of the complementary attachment members and through at least one fastener spaced apart from the complementary attachment members.

7. The cabinet as defined in claim 1, wherein the shell includes a plurality of interconnected shell panels defining inner surfaces of the cabinet, the outer panel covering and concealing at least one of the shell panels.

8. The cabinet as defined in claim 1, further comprising a door hingedly connected to the outer panel, the door being connected to the shell only through the outer panel.

9. The cabinet as defined in claim 1, wherein:
   the second attachment member is a female attachment member having a slot, the slot having an entry portion and a retention portion; and
   the first attachment member is a male attachment member including a base, the portion including a pin support and a pin extending from the pin support, wherein:
   the pin has an elongated body and an enlarged head retained at an end of the body opposite the pin support, the body being sized to be insertable into the slot, the enlarged head being sized to be insertable in the entry portion of the slot and retained in the retention portion of the slot; and
   the pin support is engaged to the base with a position of the pin support relative to the base being adjustable along a direction of a central longitudinal axis of the pin.

10. A kit including the cabinet as defined in claim 1, further comprising an additional outer panel configured for detachable connection to the shell interchangeably of the outer panel.

11. An attachment mechanism for detachably connecting two panels with an adjustable stationary relative position, the mechanism comprising:
   a female attachment member having a slot, the slot having an entry portion and a retention portion;
   a male attachment member including a base, a pin support and a pin extending from the pin support, wherein:
   the pin has an elongated body and an enlarged head retained at an end of the body opposite the pin support, the body being sized to be insertable into the slot, the enlarged head being sized to be insertable in the entry portion of the slot and retained in the retention portion of the slot; and
   the pin support is engaged to the base with a position of the pin support relative to the base being adjustable along a direction of a central longitudinal axis of the pin.

12. The attachment mechanism as defined in claim 11, wherein the pin is slidingly received in the pin support to be slidable along the direction of the central longitudinal axis of the pin between an extended position and a retracted position, the pin being biased toward the extended position.

13. The attachment mechanism as defined in claim 12, wherein:
- the pin support has an open cavity defined therein, a bottom wall of the cavity having an opening defined therein concentric with the cavity, the cavity being sized to receive the enlarged head of the pin, the opening being sized to receive the body of the pin while preventing the enlarged head from passing therethrough;
- the pin includes an enlarged end opposite the enlarged head, the opening being sized to prevent the enlarged end from passing therethrough, the pin extending through the cavity and opening with the enlarged head and enlarged end being on opposite sides of the bottom wall of the cavity; and
- the pin is biased toward the extended position by a spring received within the cavity around the body of the pin, the spring extending between the enlarged head and the bottom wall of the cavity.

14. The attachment mechanism as defined in claim 11, wherein the pin support has a cylindrical body defining a threaded outer surface, the threaded outer surface being threadingly engaged with a threaded inner surface of a cylindrical cavity defined in the base, and the pin extending concentrically with the pin support, the position of the pin support being adjustable relative to the base through a relative rotation of the threaded surfaces creating a movement of the pin support with respect to the base along the direction of the central axis of the pin support.

* * * * *